US 6,704,623 B2

(12) United States Patent
Gehring et al.

(10) Patent No.: US 6,704,623 B2
(45) Date of Patent: Mar. 9, 2004

(54) DEVICE FOR ACTUATING VEHICLE ASSEMBLIES

(75) Inventors: Ottmar Gehring, Stuttgart (DE); Christian Michael Mayer, Reutlingen (DE); Andreas Schwartzhaupt, Oberrot (DE); Gernot Spiegelberg, Heimsheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/234,855

(22) Filed: Sep. 5, 2002

(65) Prior Publication Data

US 2003/0088339 A1 May 8, 2003

(30) Foreign Application Priority Data

Sep. 6, 2001 (DE) .......................................... 101 43 551

(51) Int. Cl.[7] ................................................. G05D 1/00
(52) U.S. Cl. .............................. 701/1; 701/48; 701/102
(58) Field of Search ............................... 701/1, 48, 102; 361/730

(56) References Cited

U.S. PATENT DOCUMENTS

| 5,887,268 A | * | 3/1999 | Furukawa | ..................... 701/23 |
| 6,282,769 B1 | * | 9/2001 | Longo et al. | .................. 29/417 |
| 6,411,884 B1 | * | 6/2002 | Chutorash | ................... 701/102 |

* cited by examiner

*Primary Examiner*—Marthe Y. Marc-Coleman
(74) *Attorney, Agent, or Firm*—Crowell & Moring LLP

(57) ABSTRACT

In a device for actuating vehicle assemblies, vehicle movement data is fed to a central arithmetic unit which generates the actuation signals for the vehicle assemblies. The central arithmetic unit has a plurality of software modules, a longitudinal dynamics software module which processes a component of the predefined vehicle movement data in the longitudinal direction of the vehicle, and a lateral dynamics software module which processes a component of the vehicle movement data in the lateral direction of the vehicle.

10 Claims, 1 Drawing Sheet

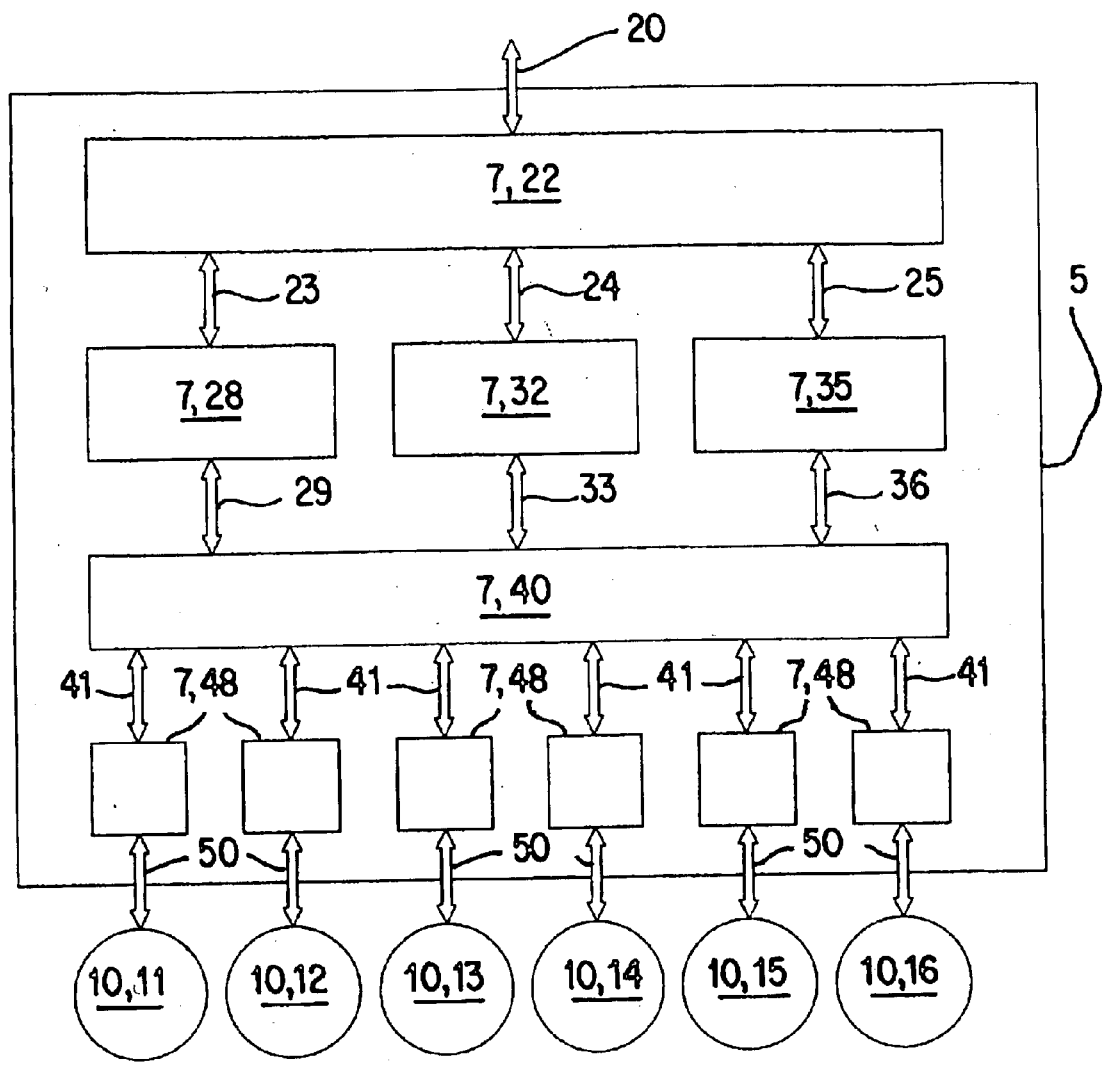

DEVICE FOR ACTUATING VEHICLE ASSEMBLIES

BACKGROUND AND SUMMARY OF THE INVENTION

This application claims the priority of German patent document 101 43 551.7, filed Sep. 6, 2001, the disclosure of which is expressly incorporated by reference herein.

The invention relates to an actuator arrangement for actuating vehicle assemblies.

In known devices of this generic type, various vehicle assemblies such as the engine, gearbox, brakes or the like are each controlled or regulated by one or more control units that are assigned thereto. Such control units receive and process input data to form output data for the assigned vehicle assemblies.

A control unit architecture which is distributed in this way is very complex. Moreover, fault management with such decentralized control unit architecture is also complex, particularly if electrically or electronically actuated vehicle assemblies that are critical for safety (for example, steering or brakes) are to be configured redundantly.

One object of the present invention is to provide a device for actuating vehicle assemblies which can be implemented with little expenditure.

Another object of the invention is to provide such a device which at the same time permits simple and reliable fault management.

These and other objects and advantages are achieved by the actuator device according to the invention, in which a single central arithmetic unit is provided for all the vehicle assemblies, so that the expenditure incurred for components can be considerably reduced. The central arithmetic unit with the software modules provided therein permits a very simple fault management system. If redundancy of the software modules is required, they can be provided with redundancy within a common central arithmetic unit, and/or in a further central arithmetic unit identical to the first central arithmetic unit, so that hardware redundancy is also provided.

A further advantage of the central arithmetic unit with the software modules is that the device can be easily extended. As vehicles are generally not equipped identically, heretofore for different vehicle equipment levels it was also necessary to provide a different control unit architecture with respectively different cabling. For example, these can be vehicles with or without level control or with or without "active body control" (vehicle assembly for compensating rolling and pitching movements of the vehicle body). In the device according to the invention, the central arithmetic unit can basically be embodied identically, with all the software modules necessary to actuate all the possible vehicle assemblies being provided. If a specific vehicle assembly is not present in the vehicle into which the device is to be installed, the respective software modules in the central arithmetic unit are simply deactivated.

Other objects, advantages and novel features of the present invention will become apparent from the following detailed description of the invention when considered in conjunction with the accompanying drawings.

BRIEF DESCRIPTION OF THE DRAWINGS

The single FIGURE shows a central arithmetic unit which contains a plurality of software modules.

DETAILED DESCRIPTION OF THE DRAWING

As shown in the drawing, the central arithmetic unit 5 is provided for actuating the vehicle assemblies 11–16 in a vehicle (not illustrated in more detail). The vehicle assemblies are, for example, an engine 11, a gearbox 12, a brake system 13, a retarder 14, a steering system 15 and a level control system 16. Of course, other vehicle assemblies could also be present, as desired.

The double arrows in the FIGURE represent the exchange of data. The method of data transmission can be freely selected; for example, bi-directional bus systems or even a plurality of uni-directional bus systems may be used in order to ensure the exchange of data in both directions between each of the software modules 7.

Predefined vehicle movement data is transferred to the central arithmetic unit 5, as is represented by the double arrow 20. The predefined vehicle movement data may be values predefined by the driver, for example speed, setpoint steering angle, acceleration requests or deceleration requests, preselection of gear or the like. Alternatively, or at the same time, the predefined vehicle movement data 20 can also originate, automatically from vehicle systems, in particular driver assistance systems, present in the vehicle. An example of this would be a cruise control regulating distance between vehicles (known by the term "Distronic" by the applicant), which automatically generates predefined deceleration and acceleration values in order to maintain the safety distance from the vehicle travelling ahead, and in doing so to regulate the vehicle as far as possible to the travel speed desired by the driver.

The predefined vehicle movement data 20 is first fed to a a coordinate software module 22, which uses it to determine, for example, three data records: predefined longitudinal movement data 23, corresponding to the desired movement of the vehicle in the longitudinal direction of the vehicle (x direction), predefined lateral movement data 24 corresponding to the desired movement of the vehicle in the lateral direction of the vehicle (y direction), and predefined vertical movement data 25 corresponding to the desired movement of the vehicle in the height direction of the vehicle (z direction). The predefined vehicle movement data 20 is accordingly divided into the three coordinate directions of the Cartesian coordinate system which is fixed to the vehicle. (Instead of the Cartesian coordinates, it is of course also possible to divided the predefined vehicle movement data 20 into other coordinates of the three-dimensional space.)

The predefined longitudinal movement data 23 is then fed to a further software module 28 that determines longitudinal dynamics output signals 29. The latter contain the predefined values of the desired longitudinal dynamics of the vehicle and are assigned to the vehicle assemblies for correspondingly influencing the longitudinal dynamics of the vehicle. For example, the longitudinal dynamics of the vehicle can be influenced by means of the engine 11, the gearbox 12, the brake system 13 or the retarder 14 in accordance with the predefined value.

In an analogous fashion, the predefined lateral movement data 24 is transferred to a lateral dynamics software module 32 that generates lateral dynamics output signals 33, containing the predefined values for the vehicle assemblies for influencing the lateral dynamics of the vehicle. The lateral dynamics of the vehicle are influenced in particular by the steering system 15; however it is also possible to bring about a change in the lateral dynamics of the vehicle by wheel-specific braking of individual vehicle wheels by means of the brake system 13 or by actuating an active spring-damper system of the vehicle.

In the preferred exemplary embodiment there is also a vertical dynamics software module 35 which, by reference to the predefined vertical movement data 25, generates vertical dynamics output data 36 which contains the predefined values for the vehicle assemblies provided for changing the vertical dynamics. For example, the vertical dynamics output signals 36 for the level control system 16 are determined. If the vehicle does not have a vehicle assembly 10 for influencing the vertical dynamics of the vehicle, the vertical dynamics software module 35 can alternatively also be dispensed with.

The longitudinal dynamics output signals 29, lateral dynamics output signals 33 and vertical dynamics output signals 36 are then fed to a super-imposed software module in the central arithmetic unit 5, referred to as a vehicle stability software module 40, which can also receive further vehicle data (for example the sensor data of a yaw rate sensor a lateral acceleration sensor, and/or wheel speed sensors). The vehicle stability software module 40 checks the longitudinal dynamics output signals 29, the lateral dynamics output signals 33 and the vertical dynamics output signals 36 to determine whether the predefined desired vehicle movement values contained therein ensure a stable state of the vehicle in terms of dynamics of movement. If not, the vehicle stability software module 40 can modify the longitudinal dynamics output signals 29, the lateral dynamics output signals 33, and/or the vertical dynamics output signals 36 in such a way that a stable movement-dynamics state of the vehicle can be maintained or restored.

The vehicle stability software module 40 then outputs predefined assembly signals 41 to each vehicle assembly present.

In the preferred embodiment illustrated in the FIGURE, a software assembly module 48 is provided in the central arithmetic unit 5 for each vehicle assembly, and carries out, for example, specific regulating tasks for the assigned vehicle assembly. By virtue of their integration into the central arithmetic unit 5 these modules 48 are protected by the fault management system provided for the central arithmetic unit 5; therefore there is no need for a separate assembly-related fault handling system. By reference to the predefined assembly signal 41 transferred to an assembly module 48, each assembly module 48 generates an actuation signal 50 for the assigned vehicle assembly 10.

As an alternative, the predefined assembly signals 41 can be transferred directly to the vehicle assemblies 10, and to constitute the actuation signals 50 for the vehicle assemblies. In such a case the assembly modules 48 are dispensed with.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for actuating vehicle assemblies, comprising a central arithmetic unit coupled to receive vehicle movement data that is converted by means of a plurality of software modules of the central arithmetic unit to form actuation signals for the vehicle assemblies, wherein:

at least one software module of said central arithmetic unit is embodied as a longitudinal dynamics software module and processes a component of the vehicle movement data in the longitudinal direction of the vehicle; and at least one further software module of said central arithmetic unit is embodied as a lateral dynamics software module in the lateral direction of the vehicle.

2. The device according to claim 1, wherein said central arithmetic unit further comprises at least one vertical dynamics software module that processes a component of the vehicle movement data in a vertical direction of the vehicle.

3. The device according to claim 2, wherein output signals from at least one of the longitudinal dynamics software module, the lateral dynamics software module, and the vertical dynamics software module is fed to a vehicle stability software module which regulates stability of the travel dynamics of the vehicle and generates an assembly signal for each vehicle assembly provided in the vehicle.

4. The device according to claim 3, wherein the assembly signals are transferred directly to the respective vehicle assemblies.

5. The device according to claim 3, wherein at least one of the vehicle assemblies is assigned to a software assembly module which generates actuation signals determined for the assigned vehicle assembly, based on an assembly signal of the vehicle stability software module.

6. The device according to claim 1, wherein said central arithmetic unit comprises a coordinate software module which transforms the vehicle movement data into at least one of longitudinal, lateral and vertical movement data, and transfers it to a respectively assigned longitudinal, lateral or vertical dynamics software module.

7. A device for actuating vehicle assemblies, comprising:

a single central arithmetic unit having an input for receiving vehicle movement command data; wherein said single arithmetic unit includes, at least one longitudinal dynamics software module that processes a component of the vehicle movement command data in the longitudinal direction of the vehicle;

at least one lateral dynamics software module that processes a component of vehicle movement command data in the lateral direction of the vehicle; and a plurality of software modules that process signals from said longitudinal and lateral dynamics software modules to generate actuation signals for controlling respective ones of said vehicle assemblies.

8. The device according to claim 7, wherein said central arithmetic unit further comprises at least one vertical dynamics software module that processes a component of the vehicle movement data in a vertical direction of the vehicle.

9. The device according to claim 8, wherein output signals from at least one of the longitudinal dynamics software module, the lateral dynamics software module, and the vertical dynamics software module is fed to a vehicle stability software module which regulates stability of the travel dynamics of the vehicle and generates an assembly signal for each vehicle assembly provided in the vehicle.

10. The device according to claim 7, wherein said central arithmetic unit comprises a coordinate software module which transforms the vehicle movement data into at least one of longitudinal, lateral and vertical movement data, and transfers it to a respectively assigned longitudinal, lateral or vertical dynamics software module.

* * * * *